(12) United States Patent
Wong et al.

(10) Patent No.: US 9,168,703 B2
(45) Date of Patent: Oct. 27, 2015

(54) CURABLE COMPOSITIONS, PROCESSES FOR USING SUCH COMPOSITIONS TO PREPARE COMPOSITES AND PROCESSES FOR PREPARING COMPOSITES HAVING SUPERIOR SURFACE FINISH AND HIGH FIBER CONSOLIDATION

(71) Applicant: Henkel Corporation, Rocky Hill, CT (US)

(72) Inventors: Alex Chor-Yiu Wong, Dallas, TX (US); Xinyu Du, Brentwood, CA (US); Wei Helen Li, San Ramon, CA (US); Raymond S. Wong, San Ramon, CA (US); Noel Fuentes, Danville, CA (US)

(73) Assignee: Henkel IP & Holding GmbH, Duesseldorf (DE)

( * ) Notice: Subject to any disclaimer, the term of this patent is extended or adjusted under 35 U.S.C. 154(b) by 243 days.

(21) Appl. No.: 13/648,670

(22) Filed: Oct. 10, 2012

(65) Prior Publication Data

US 2013/0035013 A1 Feb. 7, 2013

Related U.S. Application Data

(63) Continuation of application No. PCT/US2011/032003, filed on Apr. 12, 2011.

(60) Provisional application No. 61/323,629, filed on Apr. 13, 2010, provisional application No. 61/385,793, filed on Sep. 23, 2010.

(51) Int. Cl.
| | |
|---|---|
| *B29C 70/48* | (2006.01) |
| *B29C 44/12* | (2006.01) |
| *B29C 70/66* | (2006.01) |
| *C08G 59/40* | (2006.01) |
| *C08L 61/06* | (2006.01) |
| *C08L 79/04* | (2006.01) |

(52) U.S. Cl.
CPC ............... *B29C 70/48* (2013.01); *B29C 44/12* (2013.01); *B29C 70/66* (2013.01); *C08G 59/4014* (2013.01); *C08L 61/06* (2013.01); *C08L 79/04* (2013.01); *Y10T 428/249921* (2015.04); *Y10T 442/30* (2015.04); *Y10T 442/643* (2015.04); *Y10T 442/644* (2015.04); *Y10T 442/645* (2015.04)

(58) Field of Classification Search
CPC .......... B29C 70/66; B29C 70/48; B29C 44/12
USPC ........................................................ 264/139
See application file for complete search history.

(56) References Cited

U.S. PATENT DOCUMENTS

| | | | | |
|---|---|---|---|---|
| 3,674,585 | A | * 7/1972 | Windecker | .................... 156/182 |
| 4,607,091 | A | 8/1986 | Schreiber | |
| 4,952,135 | A | * 8/1990 | Douglas | ........................ 425/543 |
| 5,021,484 | A | 6/1991 | Schreiber et al. | |
| 5,180,752 | A | 1/1993 | Melber et al. | |
| 5,200,452 | A | 4/1993 | Schreiber | |
| 5,246,973 | A | * 9/1993 | Nakamura et al. | .............. 521/54 |
| 5,274,006 | A | * 12/1993 | Kagoshima et al. | ............ 521/85 |
| 5,315,462 | A | 5/1994 | Ohkubo et al. | |
| 5,369,192 | A | 11/1994 | Ko et al. | |
| 5,397,611 | A | 3/1995 | Wong | |
| 5,439,635 | A | 8/1995 | Seemann | |
| 5,445,911 | A | 8/1995 | Russell et al. | |
| 5,480,603 | A | 1/1996 | Lopez et al. | |
| 5,567,499 | A | 10/1996 | Cundiff et al. | |
| 5,580,656 | A | 12/1996 | Melber | |
| 5,677,048 | A | 10/1997 | Pushaw | |
| 5,773,121 | A | * 6/1998 | Meteer et al. | ................. 428/117 |
| 5,783,272 | A | * 7/1998 | Wong | ........................... 428/35.7 |
| 5,851,336 | A | 12/1998 | Cundiff et al. | |
| 5,902,535 | A | 5/1999 | Burgess et al. | |
| 6,156,146 | A | 12/2000 | Cundiff | |
| 6,207,786 | B1 | 3/2001 | Ishida et al. | |
| 6,607,997 | B1 | * 8/2003 | Cox et al. | ....................... 442/374 |
| 7,368,167 | B2 | 5/2008 | Johnston et al. | |
| 2005/0042961 | A1 | * 2/2005 | Lehmann et al. | ............. 442/172 |
| 2007/0007692 | A1 | 1/2007 | Lehmann et al. | |

FOREIGN PATENT DOCUMENTS

| | | |
|---|---|---|
| CN | 1413816 A | 4/2003 |
| JP | 05057805 A | 3/1993 |
| JP | 2007016121 | 1/2007 |
| JP | 2009096874 | 5/2009 |
| JP | 2009280669 A | 12/2009 |
| WO | 03018674 | 3/2003 |

OTHER PUBLICATIONS

Li, W.H., S.L. Lehmann, R.S. Wong, Advanced Composite Structures Using New Resin Technology Offer Weight and Cost Savings, Proc. 2005 SAMPE International Symposium (2005), 11 pages.*
AkzoNobel, Short introduction to Expancel Microspheres, (2013) 4 pages.*
International Search Report issued in connection with International Patent Application No. PCT/US2011/032003 mailed on Jan. 9, 2012.
S. Rimdusit and H. Ishida, "Development of new class of electronic packaging materials based on ternary system of benzoxazine, epoxy, and phenolic resin," Polymer, 41, 7941-49 (2000).

* cited by examiner

*Primary Examiner* — Matthew Daniels
(74) *Attorney, Agent, or Firm* — Steven C. Bauman

(57) ABSTRACT

Curable compositions, such as oxazine-based ones, are useful in applications within the aerospace industry, such as for example as a thermosetting resin composition for use as a matrix resin in processes, such as resin transfer molding, vacuum assisted transfer molding, resin film infusion, prepregging and towpregging, where the composites or laminates so prepared have superior surface finish and high fiber consolidation.

11 Claims, No Drawings

CURABLE COMPOSITIONS, PROCESSES FOR USING SUCH COMPOSITIONS TO PREPARE COMPOSITES AND PROCESSES FOR PREPARING COMPOSITES HAVING SUPERIOR SURFACE FINISH AND HIGH FIBER CONSOLIDATION

BACKGROUND

1. Field

Curable compositions, such as oxazine-based ones, are useful in applications within the aerospace industry, such as for example as a thermosetting resin composition for use as a matrix resin in processes, such as resin transfer molding, vacuum assisted transfer molding, resin film infusion, prepregging and towpregging, where the composites or laminates so prepared have superior surface finish and high fiber consolidation.

2. Brief Description of Related Technology

Epoxy resins with various hardeners have been used extensively in the aerospace industry, both as adhesives and as matrix resins for use in prepreg assembly with a variety of substrates.

Blends of epoxy resins with other resins are known. See e.g. U.S. Pat. No. 4,607,091 (Schreiber), U.S. Pat. No. 5,021,484 (Schreiber), U.S. Pat. No. 5,200,452 (Schreiber), and U.S. Pat. No. 5,445,911 (Schreiber). These blends appear to be potentially useful in the electronics industry as the epoxy resins can reduce the melt viscosity of oxazines allowing for the use of higher filler loading while maintaining a processable viscosity. However, epoxy resins oftentimes undesirably increase the temperature at which oxazines polymerize.

Ternary blends of epoxy resins are also known. See U.S. Pat. No. 6,207,786 (Ishida), and S. Rimdusit and H. Ishida, "Development of new class of electronic packaging materials based on ternary system of benzoxazine, epoxy, and phenolic resin," *Polymer*, 41, 7941-49 (2000).

Resin transfer molding ("RTM") is a process by which a resin—conventionally and predominately, epoxy-based resin systems and maleimide-based systems—is pumped at low viscosities and under pressure into a closed mold die set containing a preform of dry fabric. The resin infuses into the preform to make a fiber-reinforced composite article. The RTM process can be used to produce at low cost composite parts that are complex in shape. These parts typically require continuous fiber reinforcement along with inside mold line and outside mold line controlled surfaces.

Fiber-reinforced composite articles may be manufactured from vacuum assisted resin transfer molding ("VaRTM"), like RTM but with an applied vacuum. VaRTM typically employs an open mold and places the system under a vacuum to assist the resin infusion process.

Resin film infusion ("RFI"), like RTM, infuses a resin into a preform placed in a mold. Here, however, the resin is in the form of a film, which is placed in the mold together with the preform. U.S. Pat. No. 5,902,535 speaks to RFI molds and processes, and is expressly incorporated herein by reference.

The matrix resin used in the RTM and VaRTM advanced possesses a low injection viscosity to allow complete wetting and infusion of the preform.

U.S. Patent Application Publication No. 2007/0007692 refers to resin transfer molding, vacuum assisted resin transfer molding and resin film infusion processes, using a heat curable composition having a benzoxazine component.

Notwithstanding the state of the technology, there is a need for new resin systems for advanced processes, particularly a resin system with improved performance properties.

SUMMARY

A process for producing composite articles in processes, such as RTM, VaRTM, RFI, prepreg and towpreg systems, using a thermosetting resin composition and an agent capable of expanding volume when exposed to elevated temperature conditions, such as expandable microspheres.

In one aspect an RTM process is provided, steps of which include:
(a) providing a thermosetting resin composition into a closed mold containing a preform, each of which optionally with an agent capable of expanding volume;
(b) exposing the interior of the mold to a first elevated temperature and elevated pressure sufficient to wet the preform with the thermosetting resin composition; and
(c) curing the thermosetting resin composition-impregnated preform within the mold at a second elevated temperature to form a RTM product. Provided, of course, that an agent capable of expanding volume is present in at least one of the fibers or the thermosetting resin composition.

In another aspect a VaRTM process is provided, steps of which include:
providing a preform into a mold, optionally with an agent capable of expanding volume;
providing a thermosetting resin composition into the mold under a first elevated temperature and under vacuum for a time sufficient to allow the composition to wet the preform where the thermosetting resin composition optionally includes an agent capable of expanding volume; and
exposing the mold containing the composition wetted-preform to a second elevated temperature while under vacuum sufficient to cure the thermosetting resin composition-wetted preform within the mold to form a VaRTM product.

In yet another aspect, there is provided an RFI process, steps of which include:
providing a preform into a closed mold containing a thermosetting resin composition in film form each of which optionally, with an agent capable of expanding volume;
exposing the interior of the mold to a first elevated temperature and optionally vacuum, while the exterior of the mold is exposed to an elevated pressure, for a time sufficient to infuse the preform with the thermosetting resin composition; and
curing the thermosetting resin composition-infused preform within the mold at a second elevated temperature to form an RFI product. Provided, of course, that an agent capable of expanding volume is present in at least one of the fibers or the thermosetting resin composition.

In yet another aspect, processes for producing a prepreg are also provided. One such process includes the steps of (a) providing fibers, such as in a layer format, optionally, with an agent capable of expanding volume; (b) providing a thermosetting resin composition, optionally with an agent capable of expanding volume; and (c) joining the thermosetting resin composition and the fibers to form a prepreg assembly, and exposing the resulting prepreg assembly to elevated temperature and pressure conditions sufficient to infuse the fibers with the thermosetting resin composition to form a prepreg.

Another such process for producing a prepreg, includes the steps of (a) providing the fibers, optionally, with an agent capable of expanding volume; (b) providing the thermosetting resin composition in liquid form, optionally, with; (c) passing the fibers through the liquid thermosetting resin composition to infuse the fibers with the thermosetting resin composition to form a prepreg assembly; and (d) removing excess thermosetting resin composition from the prepreg assembly.

In a similar manner to the prepregging processes, towpregging processes are also provided.

In each of these processes, an agent capable of expanding volume, either forms part of the thermosetting resin composition, is added to the preform or fibers, or in the case of RFI, RIM or VaRTM is added in a film or layer form, or combinations thereof. The agent expands during the curing process. This expansion seems to generate an additional pressure component during the cure process (applied external pressure together with pressure from microspheres), leading to a net increase of the system "fluid pressure" during cure. This offset at least to a degree the impact of volatile generation during the cure process. The additional fluid pressure seems to improve the surface quality of the composite laminate, together with and confers upon the laminate increased mechanical property performance.

In yet another aspect, a film comprising (a) a release liner; (b) a resin component; and (c) an expandable agent, is provided and in yet another aspect a process for improving the surface finish of and the resin consolidation in a composite or laminate part, steps of which comprise (a) providing a perform into a mold; (b) providing such a described film onto the perform disposed within the mold; (c) providing a resin into the mold; (d) subjecting the perform, film and resin to conditions appropriate to cure the resin and expand the film to form a composite or laminate part; and (e) removing the expanded film from the composite or laminate part to reveal a composite or laminate part having improving surface finish and resin consolidation.

Of course, products made by these processes are also provided.

The present invention will be more fully understood by a reading of the following detailed description of the invention.

DETAILED DESCRIPTION

As noted above, in one aspect a RTM process is provided, steps of which include:
(a) providing a thermosetting resin composition into a closed mold containing a preform, each of which optionally, includes or is in contact with an agent capable of expanding volume;
(b) exposing the interior of the mold to a first elevated temperature and elevated pressure sufficient to wet the preform with the thermosetting resin composition; and
(c) curing the thermosetting resin composition-impregnated preform within the mold at a second elevated temperature to form a RTM product. Provided, of course, that an agent capable of expanding volume is present in at least one of the fibers or the thermosetting resin composition.

In another aspect, a VaRTM process is provided, steps of which include:
(a) providing a preform into a mold, where the preform, optionally, is in contact with an agent capable of expanding volume;
(b) providing a thermosetting resin composition into the mold under a first elevated temperature and under vacuum for a time sufficient to allow the composition to wet the preform, wherein the thermosetting resin composition, optionally, includes an agent capable of expanding volume; and
(c) exposing the mold containing the composition wetted-preform to a second elevated temperature while under vacuum sufficient to cure the thermosetting resin composition-wetted preform within the mold to form a VaRTM product.

In yet another aspect, an RFI process is provided, steps of which include:
(a) providing a preform into a closed mold containing a thermosetting resin composition in film form, each of which optionally, with an agent capable of expanding volume;
(b) exposing the interior of the mold to a first elevated temperature and optionally vacuum, while the exterior of the mold is exposed to an elevated pressure, for a time sufficient to infuse the preform with the thermosetting resin composition; and
(c) curing the thermosetting resin composition-infused preform within the mold at a second elevated temperature to form an RFI product. Provided of course that an agent capable of expanding volume is present in at least one of the fibers or the thermosetting resin composition. In certain aspects of these embodiments the agent capable of expanding is presented in a film form. Thus, a film is provided, which broadly speaking includes a release liner; b. a resin component; and c. an expandable agent.

In use, the film can improve the surface finish of and the resin consolidation in a composite or laminate part. A process for using the film therefore includes the steps of:
a. providing a perform into a mold;
b. providing the film onto the perform disposed within the mold;
c. providing a resin into the mold;
d. subjecting the perform, film and resin to conditions appropriate to cure the resin and expand the film to form a composite or laminate part; and
e. removing the expanded film from the composite or laminate part to reveal a composite or laminate part having improving surface finish and resin consolidation.

In yet another aspect, processes for producing a prepreg are also provided. One such process includes the steps of (a) providing fibers, such as in a layer format, optionally, in contact with an agent capable of expanding volume; (b) providing the thermosetting resin composition, optionally, including an agent capable of expanding volume; and (c) joining the thermosetting resin composition and the fibers to form a prepreg assembly, and exposing the resulting prepreg assembly to elevated temperature and pressure conditions sufficient to infuse the fibers with the thermosetting resin composition to form a prepreg. Provided of course that an agent capable of expanding volume is present with or in at least one of the fibers or the thermosetting resin composition.

Another such process for producing a prepreg, includes the steps of (a) providing the fibers, optionally, with an agent capable of expanding volume; (b) providing the thermosetting resin composition in liquid form, optionally, with an agent capable of expanding volume; (c) passing the fibers through the liquid thermosetting resin composition to infuse the fibers with the thermosetting resin composition to form a prepreg assembly; and (d) removing excess thermosetting resin composition from the prepreg assembly. Again, provided of course that an agent capable of expanding volume is present with or in at least one of the fibers or the thermosetting resin composition.

In a similar manner to the prepregging processes, towpregging processes are also provided.

In some of these processes, as noted, an oxazine component, with (ii) an agent capable of expanding volume, either forms part of the thermosetting resin composition or is added to the preform or fibers.

In yet another aspect, a film comprising (a) a release liner; (b) a resin component; and (c) an expandable agent, is provided and in yet another aspect a process for improving the surface finish of and the resin consolidation in a composite or laminate part, steps of which comprise (a) providing a perform into a mold; (b) providing such a described film onto the perform disposed within the mold; (c) providing a resin into the mold; (d) subjecting the perform, film and resin to conditions appropriate to cure the resin and expand the film to form a composite or laminate part; and (e) removing the expanded film from the composite or laminate part to reveal a composite or laminate part having improving surface finish and resin consolidation.

Of course, the invention provides products, such as RFI, RTM, VaRTM and prepreg or towpreg products, made by these processes.

In still another aspect, the invention provides a binder composition—useful in both the RTM and VaRTM processes—which is partially cured by exposure to elevated temperature conditions over time sufficient to increase the melting point higher than the temperature at which a matrix resin composition is to be infused into a preform and lower than the point at which the partially cured binder composition and the matrix resin composition are miscible.

Complex three dimensional part geometries may be molded in some of the processes described herein as a single piece unit. RFI, for instance, is particularly useful for molding large composite parts, as it defines the entire geometry of the part in a single process cycle, thereby eliminating any subsequent assembly or bonding processes. In the aerospace industry, for one, it is not uncommon for parts to be up to 100 feet in length and up to 30 feet in width, located on lofted surfaces with integral stiffening and attachment details. Using these processes to form such large parts, assembly and tooling costs normally associated with a mechanically fastened or bonded structure may be reduced. In addition, narrow engineering tolerances may be realized using these advanced processes to enable assembly of a large aircraft structure with minimal shimming, typically associated with non-monolithic components constructed from sub-assemblies.

In an RFI process, a resin film molding tool is ordinarily used, which includes an outer mold tool, which includes a facing sheet supported by a support structure. A resin film prepared from a thermosetting resin composition with or without an agent capable of expanding volume for instance when exposed to elevated temperature conditions, such as expandable microspheres positioned on the facing sheet, and a preform is positioned on the resin film. Onto and/or about the preform may also be placed an agent capable of expanding volume for instance when exposed to elevated temperature conditions, such as expandable microspheres.

The preform is designed in the shape of a desired article to be fabricated from compositing materials, such as fibers made from carbon, aramid, ceramic and the like. The preform may include a preform skin, as described in U.S. Pat. No. 5,281,388, the disclosure of which is hereby expressly incorporated herein by reference.

RTM systems are well known, such as those described in U.S. Pat. Nos. 5,369,192, 5,567,499, 5,677,048, 5,851,336, and 6,156,146, which are incorporated herein by reference. VaRTM systems are also well known, such as those described in U.S. Pat. Nos. 5,315,462, 5,480,603 and 5,439,635, each of which also expressly are incorporated herein by reference.

RTM systems produce composite articles from resin impregnated preforms. The preform is placed in a cavity mold. Onto and/or about the preform may also be placed an agent capable of expanding volume for instance when exposed to elevated temperature conditions, such as expandable microspheres. A thermosetting resin composition is then injected into the mold to wet and infuse the fibers of the preform. In an RTM process, the thermosetting resin composition is introduced into the cavity mold under pressure. The thermosetting resin composition-infused preform is cured under elevated temperature. The resulting solid article may be subjected to post curing operations to produce a final composite article, though this is not required.

Thus, with the RTM process, the preform is placed, within the mold. The preform used in the RTM process may include heat curable binder composition, tacked to the fibers which make up the preform.

In an RTM process, therefore, the mold is then closed and the thermosetting resin composition is introduced, and allowed to infuse the preform. This introduction may occur under mildly elevated temperature conditions to improve flow characteristics of the thermosetting resin composition for a time sufficient to allow wetting of the preform.

The interior of the mold is then heated to, and maintained at, a temperature (ordinarily within the range of 250° F. to 350° F.) which is sufficient to cure the thermosetting resin composition, for a time sufficient to cure the thermosetting resin composition. This time is ordinarily within the 60 to 90 minute range, depending of course on the precise constituents of the thermosetting resin composition. After cure is complete, the temperature of the mold is allowed to cool and the RTM product made by the process is removed.

In a VaRTM process, after providing the preform with or without an agent capable of expanding volume for instance when exposed to elevated temperature conditions, such as expandable microspheres disposed onto and/or about the preform, a dispersing medium may be disposed thereover. The dispersing medium is positioned on the surface of the preform in an envelope within the mold. The dispersing medium is oftentimes a flexible sheet or liner. A vacuum is applied to collapse the dispersing medium against the preform and assist in the introduction of the thermosetting resin composition into the mold to wet and infuse the preform. The thermosetting resin composition may include an agent capable of expanding volume for instance when exposed to elevated temperature conditions, such as expandable microspheres.

The thermosetting resin composition is injected into the mold, and allowed to wet and infuse the preform. This injection may again occur under a mildly elevated temperature, this time through and under vacuum for a period of time sufficient to allow the composition to wet and infuse the preform.

The thermosetting resin composition is introduced under vacuum into the envelope to wet and infuse the preform. The vacuum is applied to the interior of the envelope via a vacuum line to collapse the flexible sheet against the preform. The vacuum draws the thermosetting resin composition through the preform and helps to avoid the formation of air bubbles or voids in the finished article. The thermosetting resin composition cures while being subjected to the vacuum.

The mold is then exposed to an elevated temperature, ordinarily within the range at 250° F. to 350° F., while remaining under vacuum, for a period of time sufficient to cure the thermosetting resin composition-wetted preform within the mold. This time period again is ordinarily within the 60 to 90 minute range. The vacuum also draws off any fumes produced during the curing process. After cure is complete, the temperature of the mold is allowed to cool and the VaRTM product made by the process is removed.

The resulting solid article so made by the VaRTM process may be subjected to post curing operations to produce a final composite article.

The first step in either of the RTM/VaRTM processes is thus to fabricate a fiber preform in the shape of the desired article. The preform generally includes a number of fabric layers or plies made from these fibers that impart the desired reinforcing properties to a resulting composite article. Once the fiber preform has been fabricated, the preform is placed in a mold.

In an alternative embodiment, an agent capable of expanding volume in a film or layer form may be applied onto the preform disposed within a mold, where when the mold is closed and the temperature and/or pressure within is elevated positive pressure is provided onto the laminate to be formed from the perform and injected matrix resin such that consolidation is enhanced, the effects of cure shrinkage are reduced, cure stress is reduced, surface imperfections and void volume are reduced, and fiber volume and resin/fiber wetting are increased.

Consolidation and cure shrinkage are issues for composite or laminate formation, particularly in RFI, RTM and/or VaRTM processing. Consolidation pressure is ordinarily provided by autoclave or a press, with pressures reaching in the range of up to 100 psi. Even when such external pressure is increased beyond 100 psi, the resin may not see such pressure as the fibers begin to bear the load. And resin fluid pressure can further reduce as the resin cures and begins to shrink. In building a large composite part where a temperature gradient exists at various locations within the part, low fluid pressure at and/or during cure can occur at the temperature lagging areas, resulting in poor wetting and poor composite properties.

In addition, when matrix resins include resins that have low viscosity and high volatility, resin volatilization within the closed mold during the infusion process may create imperfection/microvoids in the composite or laminate.

A layer of an expandable agent—whether applied as a coating in solid or liquid form—should contain an expandable agent at a level of about 0.1-100% by weight. The expandable agent should be activated by reaching a certain temperature, which should be from about 25-190° C., at ambient or elevated pressure, which should be in the range of up to about 400 psi, such as about 200-400 psi. The expandable agent should be capable of expanding from 1-10,000% of its room temperature volume at the activation temperature. The form and thickness of the applied layer is adjustable for various mold geometries, with the layer being about 0.02 mm or greater in thickness. The matrix of the film layer itself may be a thermoplastic or a thermosetting resin film, such as an epoxy or benzoxazine resin film. When the matrix for the film layer is a thermosetting resin it may be based on similar chemistry as the matrix resin described herein. The film may be formed prior to use, and once formed applied as a layer onto the fiber preform in the closed mold. Alternatively, the film may be formed onto a release substrate, such as a sheet made of Teflon, and the so-formed film applied as a layer onto the fiber preform in the closed mold.

As noted, in use, the film layer is applied onto the fiber perform, prior to introducing the resin into the closed mold. During cure in a closed mold process, such as RTM, the film layer expands and exerts positive pressure onto the resin typically before the resin reaches gelation, as the activation temperature of the expandable layer is typically below the temperature at which the resin begins to gel. Thus, a positive fluid pressure is maintained in the resin throughout the gelation thereof. After the processing and the composite or laminate is formed, the film layer itself can be removed, such as by peeling it away from the formed composite or laminate, and thus does not become a part of the formed composite or laminate.

Prepregs formed from fibers, which may be laid up in a layer format, and infused with the thermosetting resin composition are also provided.

In this regard, processes for producing a prepreg are also provided. One such process includes the steps of (a) providing fibers, such as in a layer format, optionally, with an agent capable of expanding volume; (b) providing the thermosetting resin composition, optionally, with an agent capable of expanding volume; and (c) joining the thermosetting resin composition and the fibers to form a prepreg assembly, and exposing the resulting prepreg assembly to elevated temperature and pressure conditions sufficient to infuse the fibers with the thermosetting resin composition to form a prepreg. Provided of course that an agent capable of expanding volume is present in at least one of the fibers or the thermosetting resin composition.

Another such process for producing a prepreg, includes the steps of (a) providing the fibers, optionally, with an agent capable of expanding volume; (b) providing the thermosetting resin composition in liquid form, optionally, with an agent capable of expanding volume; (c) passing the fibers through the liquid thermosetting resin composition to infuse the fibers with the thermosetting resin composition to form a prepreg assembly; and (d) removing excess thermosetting resin composition from the prepreg assembly. Again, provided of course that an agent capable of expanding volume is present in at least one of the fibers or the thermosetting resin composition.

The fiber may be constructed from unidirectional fibers, woven fibers, chopped fibers, non-woven fibers or long, discontinuous fibers.

The fiber chosen may be selected from carbon, glass, aramid, boron, polyalkylene, quartz, polybenzimidazole, polyetheretherketone, polyphenylene sulfide, poly p-phenylene benzobisoaxazole, silicon carbide, phenolformaldehyde, phthalate and napthenoate.

The carbon is selected from polyacrylonitrile, pitch and acrylic, and the glass is selected from S glass, S2 glass, E glass, R glass, A glass, AR glass, C glass, D glass, ECR glass, glass filament, staple glass, T glass and zirconium oxide glass.

The preform may be constructed from the same list of materials of which the fibers may be constructed.

The thermosetting resin composition should have a viscosity in the range of 10 to 5000 cps at resin injection temperature from 160° F. to 250° F. (10 to 3000 cps for RTM or VaRTM; 10-5000 cps for RFI; 1000 to 20000 cps at an impregnation temperature of 160° F. to 250° F. for matrix resin in prepreg or towpreg). In addition, the time within which the viscosity of the thermosetting resin composition increases by 100% under the process conditions is in the range of 30 minutes to 10 hours.

The thermosetting resin composition may include oxazine, oxazoline, epoxy, episulfide, cyanate ester, maleimide, nadimide, itaconimide, phenolic, thiophenolic and combinations thereof.

Where the thermosetting resin composition includes as at least a portion thereof an oxazine component, the oxazine component may be embraced by the following structure:

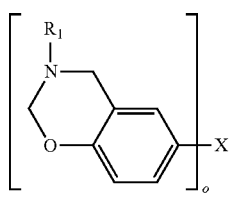

where o is 1-4, X is selected from a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), and $R_1$ is selected from hydrogen, alkyl and aryl.

More specifically, the oxazine may be embraced by the following structure:

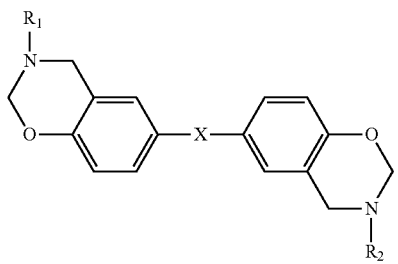

where X is selected from of a direct bond, $CH_2$, $C(CH_3)_2$, $C{=}O$, $S$, $S{=}O$ and $O{=}S{=}O$, and $R_1$ and $R_2$ are the same or different and are selected from hydrogen, alkyl, such as methyl, ethyl, propyls and butyls, and aryl.

The oxazine thus may be selected from any of the following exemplified structures:

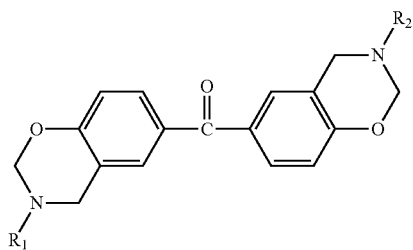

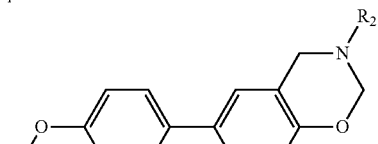

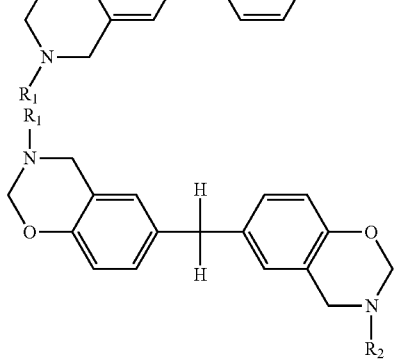

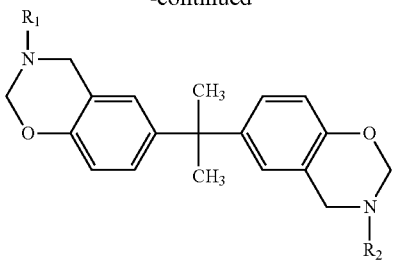

where $R_1$ and $R_2$ are as defined above.

Though not embraced by either of oxazine structures I or II additional oxazines may be embraced by the following structures:

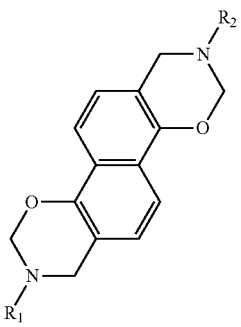

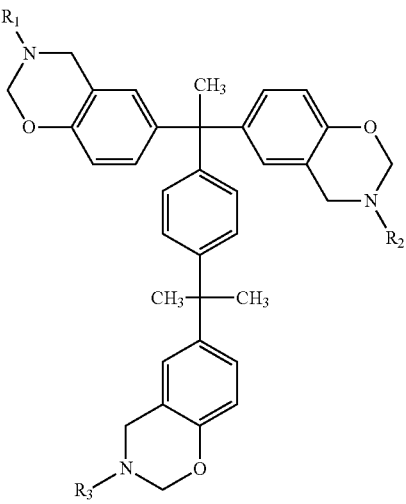

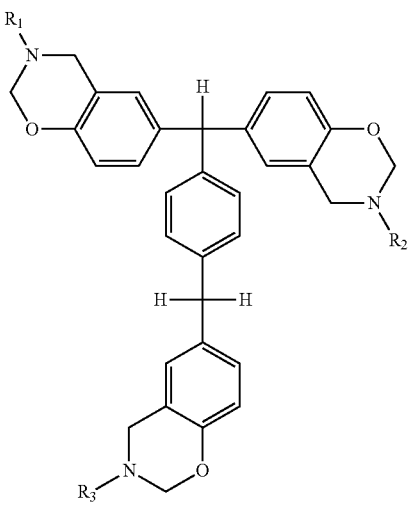

where $R_1$ are $R_2$ are as defined above, and $R_3$ is defined as $R_1$ or $R_2$.

Specific examples of these oxazines therefore include:

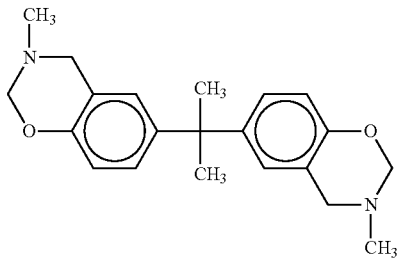

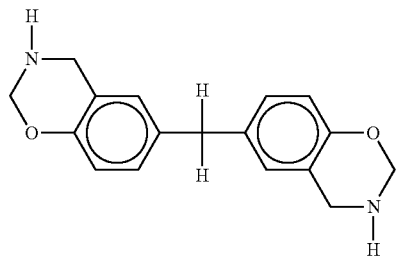

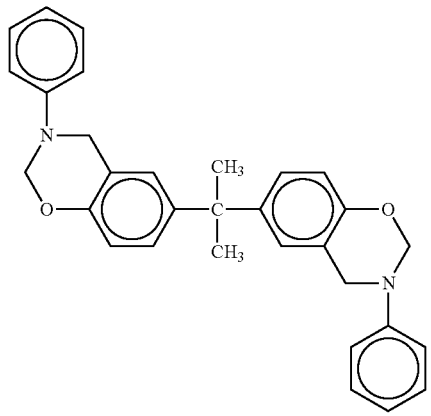

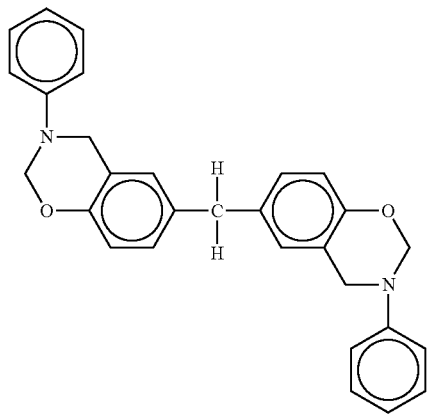

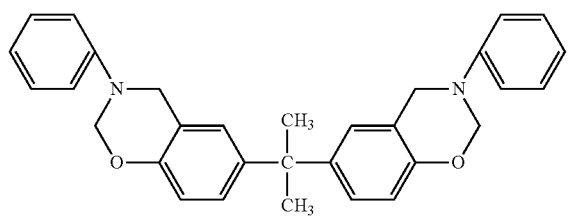

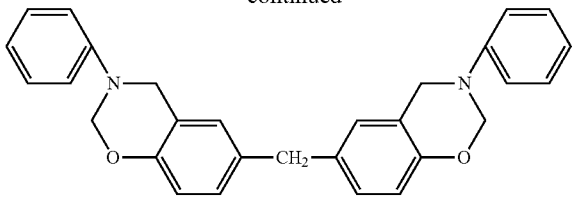

The oxazine component may include the combination of multifunctional oxazines and monofunctional oxazines. Examples of monofunctional oxazines may be embraced by the following structure:

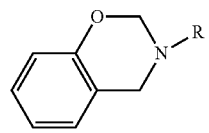

where R is alkyl, such as methyl, ethyl, propyls and butyls.

As the oxazoline, compounds embraced by the following structure are suitable,

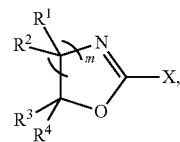

where $R^1$, $R^2$, $R^3$, $R^4$, and X are hydrogen or as regards x a direct bond to a divalent organic radical, and m is 1.

Exemplary compounds have the structure

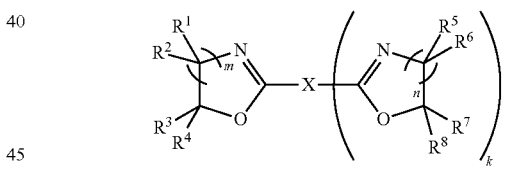

in which k is 0-6; m and n are each independently 1 or 2 provided that at least one of m or n is 1; X is a monovalent or polyvalent radical selected from branched chain alkyl, alkylene, alkylene oxide, ester, amide, carbamate and urethane species or linkages, having from about 12 to about 500 carbon atoms; and $R^1$ to $R^8$ are each independently selected from $C_{1-40}$ alkyl, $C_{2-40}$ alkenyl, each of which being optionally substituted or interrupted by one or more —O—, —NH—, —S—, —CO—, —C(O)O—, —NHC(O)—, and $C_{6-20}$ aryl groups.

The oxazoline compounds include 4,4',5,5'-tetrahydro-2,2'-bis-oxazole, 2,2'-bis(2-oxazoline); a 2,2'-(alkanediyl)bis[4,4-dihydrooxazole], e.g., 2,2'-(2,4-butanediyl)bis[4,5-dihydrooxazole] and 2,2'-(1,2-ethanediyl)bis[4,5-dihydrooxazole]; a 2,2'-(arylene)bis[4,5-dihydrooxazole]; e.g. 2,2'-(1,4-phenylene)bis(4,5-dihydrooxazole], 2,2'-(1,5-naphthalenyl)bis(4,5-dihydrooxazole], 2,2'-(1,3-phenylene) bis[4,5-dihydrooxazole), and 2,2'-(1,8-anthracenyl)bis[4,5-dihydrooxazole; a sulfonyl, oxy, thio or alkylene bis 2-(arylene)[4,5-dihydrooxazole, e.g. sulfonyl bis 2-(1,4-phenylene)[4,5-dihydrooxazole], thio bis 2,2'-(1,4-phenylene)[4,5-dihydrooxazole] and methylene bis 2,2'-(1,4-phenylene)[4,5-dihydrooxazole]; a 2,2',2"-(1,3,5-arylene)tris[4,5-dihydrooxazole], e.g., 2,2',2"-tris(4,5-dihydrooxazole]1,3,5-benzene; a poly[(2-alkenyl) 4,5-hydrooxazole], e.g., poly[2-(2-propenyl)4,5-dihydrooxazole], and others and mixtures thereof.

In some embodiments, the oxazoline compounds will have the following structures.

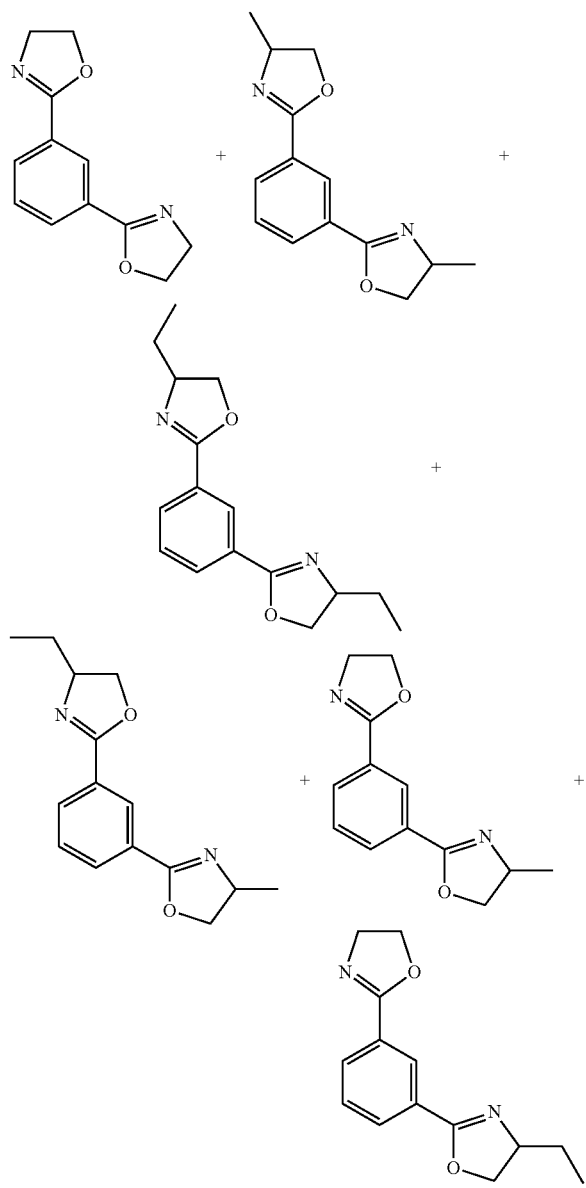

In general, a large number of polyepoxides having at least about two 1,2-epoxy groups per molecule are suitable for use herein. The polyepoxides may be saturated, unsaturated, cyclic or acyclic, alipha-tic, alicyclic, aromatic or heterocyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefor are, for example, resorcinol, pyrocatechol, hydroquinone, bisphenol A (bis(4-hydroxyphenyl)-2,2-propane), bisphenol F (bis(4-hydroxyphenyl)-methane), bisphenol S, biphenol, bis(4-hydroxyphenyl)-1,1-isobutane, 4,4'-dihydroxy-benzophenone, bis(4-hydroxyphenyl)-1,1-ethane, and 1,5-hydroxy-naphthalene. Other suitable polyphenols as the basis for the polyglycidyl ethers are the known condensation products of phenol and formaldehyde or acetaldehyde of the novolak resin-type.

Other polyepoxides that are in principle suitable for use herein are the polyglycidyl ethers of polyalcohols or diamines. Such polyglycidyl ethers are derived from polyalcohols, such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Still other polyepoxides are polyglycidyl esters of polycarboxylic acids, for example, reaction products of glycidol or epichlorohydrin with aliphatic or aromatic polycarboxylic acids, such as oxalic acid, succinic acid, glutaric acid, terephthalic acid or a dimeric fatty acid.

And still other epoxides are derived from the epoxidation products of olefinically-unsaturated cycloaliphatic compounds or from natural oils and fats.

Particularly desirable are liquid epoxy resins derived from the reaction of bisphenol A or bisphenol F and epichlorohydrin. The epoxy resins that are liquid at room temperature generally have epoxy equivalent weights of from 150 to about 480.

Typically, the thermosetting resin composition may contain from about 25 to about 55 weight percent, such as from about 30 to about 50 weight percent of epoxy.

The composition may include as at least a portion of the epoxy component a reactive diluent such as a mono-epoxide (e.g., monoglycidyl ethers of alkyl- and alkenyl-substituted phenols).

In addition to epoxy, episulfide is desirable as well, whether they are full or partial episulfides, provided that they are in the solid state. Episulfides may be commercially available or readily prepared from the corresponding epoxy through known synthetic methods.

The resin component may also include one or more of cyanate ester, maleimide, nadimide, itaconimide, phenolic and/or thiophenolic.

The resin component should be present in the thermosetting resin composition in an amount in the range of about 5 to about 60 percent by weight, such as about 10 to about 50 percent by weight, desirably about 15 to about 35 percent by weight, based on the total weight of the composition.

In one version, the thermosetting resin composition may also include a toughener. One such toughener is an acrylonitrile-butadiene co-polymer having secondary amine terminal groups. Other tougheners may include poly(propylene) oxide; polyether sulfone, such as PES 5003P, available commercially from Sumitomo Chemical Company, Japan; carboxy-terminated acrylonitrile butadienes; hydroxy-terminated acrylonitrile butadienes; core shell polymers; and BLENDEX 338, SILTEM STM 1500 and ULTEM 2000, which are available commercially from General Electric Company. ULTEM 2000 (CAS Reg. No. 61128-46-9) is a polyetherimide having a molecular weight ("Mw") of about 30,000±10,000. Those available commercially from Zeon Chemicals under the tradename NIPOL are also desirable. Of the NIPOL branded rubbers, acrylonitrile polybutadiene rubbers are particularly desirable.

When used, the toughener component should be present in the thermosetting resin component in an amount in the range of about 1 to about 90 percent by weight, such as about 10 to about 70 percent by weight, desirably about 15 to about 30 percent by weight, based on the total weight of the composition.

The curing agent may be selected from nitrogen-containing compounds such as amine compounds, amide compounds, imidazole compounds, guanidine compounds, urea compounds and derivatives and combinations thereof.

For instance, the amine compounds may be selected from, aliphatic polyamines, aromatic polyamines, alicyclic polyamines and combinations thereof.

The amine compounds may be selected from diethylenetriamine, triethylenetetramine, diethylaminopropylamine, xylenediamine, diaminodiphenylamine, isophoronediamine, menthenediamine and combinations thereof.

In addition, modified amine compounds, may be used, which include epoxy amine additives formed by the addition of an amine compound to an epoxy compound, for instance, novolac-type resin modified through reaction with aliphatic amines.

The imidazole compounds may be selected from imidazole, isoimidazole, alkyl-substituted imidazoles, and combinations thereof. More specifically, the imidazole compounds are selected from 2-methyl imidazole, 2-ethyl-4-methylimidazole, 2,4-dimethylimidazole, butylimidazole, 2-heptadecenyl-4-methylimidazole, 2-undecenylimidazole, 1-vinyl-2-methylimidazole, 2-n-heptadecylimidazole, 2-undecylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition products of an imidazole and trimellitic acid, 2-n-heptadecyl-4-methylimidazole, aryl-substituted imidazoles, phenylimidazole, benzylimidazole, 2-methyl-4,5-diphenylimidazole, 2,3,5-triphenylimidazole, 2-styrylimidazole, 1-(dodecyl benzyl)-2-methylimidazole, 2-(2-hydroxyl-4-t-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethylaminophenyl)-4,5-diphenylimidazole, 2-(2-hydroxyphenyl)-4,5-diphenylimidazole, di(4,5-diphenyl-2-imidazole)-benzene-1,4,2-naphthyl-4,5-diphenylimidazole, 1-benzyl-2-methylimidazole, 2-p-methoxystyrylimidazole, and combinations thereof.

Modified imidazole compounds may be used as well, which include imidazole adducts formed by the addition of an imidazole compound to an epoxy compound.

Guanidines, substituted guanidines, substituted ureas, melamine resins, guanamine derivatives, cyclic tertiary amines, aromatic amines and/or mixtures thereof. The hardeners may be involved stoichiometrically in the hardening reaction; they may, however, also be catalytically active. Examples of substituted guanidines are methyl-guanidine, dimethylguanidine, trimethylguanidine, tetra-methylguanidine, methylisobiguanidine, dimethylisobiguanidine, tetramethyliso-biguanidine, hexamethylisobiguanidine, heptamethylisobiguani-dine and cyanoguani-dine (dicyandiamide). Representative guanamine derivatives include alkylated benzoguan-amine resins, benzoguanamine resins and methoxymethylethoxy-methylbenzoguanamine.

In addition to or instead of the above-mentioned hardeners, catalytically-active substituted ureas may be used. For instance, p-chlorophenyl-N,N-dimethylurea (monuron), 3-phenyl-1,1-dimethylurea (fenuron) or 3,4-dichlorophenyl-N,N-dimethylurea (diuron) are representative examples.

The amount of curing agent may depend upon a number of factors, including whether the curing agent acts as a catalyst or participates directly in crosslinking of the composition, the concentration of epoxy groups and other reactive groups in the composition, the desired curing rate and the like.

The curing agent should be present in an amount in the range of about 0.01 to about 40 percent by weight, such as about 0.5 to about 20 percent by weight, desirably about 1 to about 15 percent by weight, based on the total weight of the composition.

An agent capable of expanding volume, such as one that undergoes a phase transition when encountering a chemical stimulus (such as exposure to acidic or basic conditions, for instance) or a physical stimulus like a change in environmental conditions (such as temperature, solvent or moisture, light, electricity, magnetism, etc.) is also provided. Appropriate agents may include swellable polymers (such as ethylene vinyl alcohol, ethylene vinyl acetate and the like), polyacrylamide gels, shape memory polymers, materials containing Si—H functionality, which can liberate gas hydrogen and azodicarbonamide, a solid blowing agent that decomposes at elevated temperature to liberate a gas (commerically available examples of which are those under the trademarks UNICELL and CELOGEN). As regards azodicarbonamide, the particle size may be adjusted so as to provide the desired foaming characteristics in the foamable composition. For example, it has been found that relatively small particle size azodicarbonamides tend to produce foams having more uniform cell structure than coarser grade azodicarbonamides. "Activated" or "modified" forms of azodicarbonamide may be used.

For instance, the agent may be capable of expanding volume when exposed to elevated temperature conditions. The agent may be included as a component in the thermosetting resin composition, or contacted with the fibers or preform, or both.

As regards expandable microspheres, U.S. Pat. No. 7,368,167 (Johnston), the disclosure of which is hereby incorporated herein by reference, is directed to and discloses expandable microspheres, more specifically dry, free-flowing expanded thermoplastic clad microspheres, where the thermoplastic is a polymer material, which functions as a vapor barrier to a blowing agent at the temperatures and pressure differentials of expansion of the microsphere, has Tg values of at least about 50° C. and a density of from less than 0.0145 $g/cm^3$ to about 0.005 $g/cm^3$. When exposed to elevated temperature conditions, expandable microspheres, rupture to release a blowing agent. See also U.S. Pat. Nos. 5,180,752 and 5,580,656, the disclosures of each of which are expressly incorporated herein by reference. A particularly desirable expandable microsphere is manufactured by Henkel Corporation, and is a polyvinylidene chloride-acrylonitrile copolymer or polyacrylonitrile homopolymer microsphere with an inclusion of iso-butane as the blowing agent.

Microspheres can be made from a rather wide variety of thermoplastic polymers. In practice, the commercially available microspheres are generally limited to polyvinylidene chloride homopolymer or a random copolymer of vinylidene chloride and acrylonitrile, or a random terpolymer of polyvinylidene chloride, acrylonitrile, and divinyl benzene. Microspheres of other materials, such as polyacrylonitrile, polyalkyl methacrylates, polystyrene, or vinyl chloride, are known, but these materials are not widely and generally available.

Suitable polymers for the formation of thermoplastic microspheres for use in the present invention include materials which are effective vapor barriers to the blowing agent at expansion temperatures, and which have adequate physical properties to form self-supporting expanded microspheres with the thin wall thickness attained at the ultra low densities produced in the present invention.

Those polymers containing a substantial proportion of acrylic monomers can be employed whenever the polymer material still functions as a vapor barrier to the bowing agent at the temperatures and pressure differentials of expansion. Preferred polymers are those in which the acrylic monomer, or the majority of the acrylic monomer, is acrylonitrile. The thermoplastic polymers of interest are, for the most part, copolymers. Unless otherwise specified, the term copolymer is used herein in an inclusive sense to connote polymers formed by the polymerization of two or more monomers, and encompasses terpolymers, tetrapolymers, and the like.

Acrylic monomers useful in forming the thermoplastic polymers in the manufacture of microspheres useful in the present invention include acrylonitrile, alkyl acrylates and alkyl methacrylates, including methyl methacrylate, methyl acrylate, butyl acrylate, butyl methacrylate, isobutyl methacrylate, stearyl methacrylate, and other related acrylic monomers such as 1,3-butylene dimethacrylate, allyl methacrylate, trimethylolpropane, trimethacrylate, trimethylolpropane triacrylate, 1,4-butanediol dimethacrylate, 1,3-butanediol dimethacrylate, isobornyl methacrylate, dimethylaminoethyl methacrylate, hydroxyethyl methacrylate, hydroxypropyl methacrylate, diurethane dimethacrylate, and ethylene glycol dimethacrylate. Other non-acrylic monomers may be included in copolymers, styrene, di-vinyl benzene, vinylidene chloride and the like, typically in minor proportions in the polymer.

A wide variety of blowing agents can be employed in expandable microspheres. For instance, lower alkanes, particularly propane, butane, pentane, and mixtures thereof may be used. Blowing agents such as the Freons, such as trichlorofluoromethane, hydrocarbons such as the pentanes or butanes, like n-pentane, i-pentane, neo-pentane, butane, i-butane are commonly found in these types of in situ-expandable particles. Typically, the unexpanded particles contain from about 3 to about 40 weight % blowing agent. The selection of the blowing agent is a function of the particular thermoplastic polymer employed. Isobutene is often used as the blowing agent with polyvinylidene chloride-acrylonitrile copolymer microspheres.

In unexpanded form, the microspheres can be made in a variety of sizes, those readily available in commerce being most often on the order of 2 to 100 µm, particularly 10 to 30 µm. When expanded, these materials will have bead diameters on the order of about 10 to 300 µm, most commonly about 50 to 250 µm, and most often about 100 to 200 µm. Microspheres can be made from as small as about 0.1 µm, up to as large as about 1 millimeter, in diameter, before expansion.

When the microspheres are expanded, they are typically enlarged in diameter by a factor of 7 to 15, and even 20 times the diameter of the unexpanded beads, giving rise to a displacement expanded density, when dry, as low as less than 0.015 g/cm$^3$, preferably less than 0.0145 g/cm$^3$, and down to 0.005 g/cm$^3$.

U.S. Pat. No. 5,397,611 (Wong) reports that the thermoplastic polymer used in forming the in situ-expandable thermoplastic particles are readily prepared from a wide variety of materials.

Expandable thermoplastic resin microspheres (which can comprise, for example, volatile physical blowing agents such as hydrocarbons or halocarbons encapsulated in thermoplastic shells) may also be employed to render the resin foamable. The thermoplastic shells may be comprised of acrylic-type resins such as polymethylmethacrylate, acrylic-modified polystyrene, polyvinylidene chloride, styrene/MMA copolymers and the like. Particularly desirable expandable microspheres are available from Akzo Nobel, NL under the trademark EXPANCEL or from Henkel Corporation under the trademark DUALITE.

The particle size of the unexpanded particles, as well as the expanded microspheres can vary widely. Particle sizes for the unexpanded particles can range, for example, from about 1 µm to about 1 mm, such as from about 2 µm to about 0.5 mm. For instance, DUALITE-branded expandable microspheres can range in unexpanded particle size from about 5 µm to about 50 µm. The particle diameters expand 2 to 5 times.

Preferably, the particles used have a mixed particle size of wide spread to achieve the best packing, on expansion, in the syntactic molded foam. A desirable in situ-expandable particle is EXPANCEL 091 DU, which is believed to be a terpolymer of vinylidene chloride, acrylonitrile and methacrylonitrile containing 10-18 weight % isopentane, and possesses the following properties: average unexpanded particle size of about 12 µm with a spread of about 5-50 µm, true density (expanded in water at 100° C., kg/m), <20; TMA-T (start)° C., 125-130; T(max)° C., about 183; TMA-density, kg/m$^3$, <17.

When mixed into thermosetting resin compositions the agent capable of expanding should be used in an amount of 0.0005% to 5%, such as 0.001% to 10%, like 0.1% to 5%, desirably 0.5% to 1% by weight of the fiber weight. The thermosetting resin composition is then infused into the fiber performs as a liquid or a solid film into the coated dry fiber performs, under pressure or vacuum into a mold or vacuum bag when the thermosetting resin composition applied to or contacted with the fibers or the preform. The agent can also be applied into a thermosetting matrix resin (such as one containing an epoxy, a phenolic or a benzoxazine), which is then impregnated into dry fibers tows or fabrics made with materials such as carbon and glass, to form a prepreg. Or, the agent can be pre-coated onto dry fiber tows or fabrics of materials such as carbon or glass before impregnation by the thermosetting matrix resin. The agent can also be applied directly onto the surface of the prepregs with the thermosetting matrix resin and fibers or fabrics. The weight percent of the agent in the prepreg should be in the range from 0.001% to 10% by weight of the fiber weight.

The agent as noted may be mixed with the thermosetting resin composition or applied to or contacted with the fibers or the preform. The application at the fibers or preform may occur by mixing the agent with a carrier vehicle and then spraying the mixture onto the fibers or preform.

The agent may also be coated onto a preform or into a mold as a separate layer. As a separate layer onto the preform in a closed mold, the agent provides positive pressure onto the laminate to enhance consolidation, reduce the effects of cure shrinkage, reduce cure stress, reduce imperfection and void volume, and increase fiber volume and improve resin-fiber wetting. Typically consolidation pressure is provided by autoclave or a press, ordinarily in the range of up to 100 psi. Even when such external pressure is increased beyond 100 psi, the resin may not see such pressure as the fibers begin to bear the load. And the resin fluid pressure can be further reduced as curing occurs and shrinkage is observed.

In building a large composite part where one or more temperature gradient(s) exist(s) at various locations within the part, low fluid pressure at cure can occur at the temperature lagging areas, resulting in poor wetting and poor composite properties. In addition, when low viscosity and high volatile thermosetting resins (such as some liquid benzoxazines) are used in closed mold infusion, resin volatilization within the mold during the process may create imperfection/micro-voids in the formed laminate. Using a catalyst to control volatilization may adversely affect mechanical properties and injection process window.

The expandable layer may be in solid or flowable form, and contains an expandable agent in an amount of 0.1 up to nearly 100% based on the weight of the layer. The expandable agent in the expandable layer is temperature-activated, and capable of expanding from 1-10000% at activation temperature, which ordinarily is from 25-190° C. The form and the thickness of the layer is adjustable to accommodate various mold geometries. The expandable layer may be applied onto the fiber preform. After the laminate is cured, does not become a part thereof and can be removed. During cure of the laminate in a closed mold process (such as RTM), the agent in the expandable layer begins to expand (at a temperature below which the thermosetting resin composition starts to cure) and exerts positive pressure onto the resin (typically before the resin reaches gelation). As the activation temperature of the expandable layer is typically below the temperature at which the resin begins to gel, a positive fluid pressure in the resin is maintained throughout the gelation of the resin. In this way, improved laminate fiber consolidation, fiber volume, fiber wetting, and laminate mechanical properties may be realized. The effects of resin cure shrinkage, laminate porosity, and void volume may also be reduced.

In addition, out of autoclave cure (with a vacuum bag pressure or 14.7 psi of pressure) may be realized using the invention so described herein.

In the performance hereof, better fiber consolidation and compaction; better resin and fiber adhesion leading to better mechanical performance, such as: impact toughness and interlaminar properties, improved thermal cycling and durability; reduced thermal stress; reduced cure shrinkage; and/or improved surfacing quality, may be observed.

EXAMPLES

RTM Resin

A resin for use in an RTM process is set forth in the table below, with Sample No. 2 representing a resin in accordance with the invention (with expandable microspheres) and Sample No. 1 representing a control (without expandable microspheres).

| Component | Sample No./Amt. (Wt. %) | |
|---|---|---|
| | 1 | 2 |
| Oxazine | 74 | 74 |
| Epoxy Resin | 25 | 24.5 |
| Diethylamine salt of trifluoromethanesulfonic acid* | 1 | 1 |
| EXPANCEL 091 DU 80 | — | 0.5 |

*NACURE SUPER A223

The formulation so formed may be used in a RTM process as follows:
Preheat the formulation to a temperature of 160° F.
Insert a preform into a closed mold
Preheat the mold to a temperature of 250° F.
Apply vacuum to the mold for a period of time of 1 hour to remove volatile from the preform
Preheat resin injector to a temperature of 235° F.
Add the preheated formulation to the injector
When the formulation equilibrates at a temperature of 250° F., apply full vacuum for a period of time of 15 minutes to remove air
Release the vacuum
Inject the formulation at about the rate of 5 to 200 cc per minute using about 20 psi injection pressure, which may be increased, if desired throughout the injection to maintain the desired flow rate
When the preform is fully impregnated, close the mold resin exit ports
Pressurize the tool to 100 psi and hold at that pressure for a period of time of about 10 minutes
Ramp the mold temperature to 350° F. at 3° F. per minute
When formulation has gelled, remove the applied pressure
Hold at a temperature of 350° F. for a period of time of 3 hours
Cool to a temperature of 120° F.
Open the mold and remove the cured part.

Prepreg Resin

A resin for use in a prepregging process with fiber with the noted components in the specified amount is set forth in the table below.

| Component | Sample No./Amt. (Wt. %) | |
|---|---|---|
| | 3 | 4 |
| Oxazine | 54 | 54 |
| Epoxy Resin | 18 | 18 |
| Core Shell | 5 | 5 |
| Epoxy-terminated epoxy adduct* | 10 | 10 |
| Diethylamine salt of trifluoromethanesulfonic acid | 0.5 | 0.5 |
| EXPANCEL 091 DU 80 | — | 0.5 |
| Defoamer | 0.5 | — |
| RADEL 105 SFP | 12 | 12 |
| NIPOL | 0.3 | 0.3 |

*epoxy terminated adduct of two different epoxy materials using bisphenol A as a linking portion.

Products formed by the so-described processes that use agents capable of expanding, show improved surface finished and decreased voiding.

For RTM, compression after impact analysis showed CAI of 201 Mpa for Sample No. 1 (without expandable microspheres) as compared with 224 for Sample No. 2 (with 0.5% expandable microspheres).

For prepreg, compression after impact analysis showed CAI of 253 Mpa for Sample No. 3 (without expandable microspheres) as compared with 276 for Sample No. 4 (with 0.5% expandable microspheres in the matrix resin). In addition, inplane shear strength ("IPS") of 125 Mpa for Sample No. 3 was observed as compared with 134 Mpa for Sample No. 4.

Reduced residual stress of the cured composite (e.g., cured prepreg or RTM) is also seen.

Formation and use of Film Layer with Expandable Agent

A film layer was made from a composition whose components include bisphenol-A based epoxy resins, epoxy adduct, hydrophobic fumed silica, 4,4-diaminodiphenyl sulfone and dicyandiamide, which were blended together and then cast into a film having a thickness of 0.1 mm was formed with 10% by weight of EXPANCEL 091 DU 80 as an expandable agent.

The film layer so prepared was then coated onto a 0.02 mm thick TEFLON release substrate.

The so prepared film (i.e., film layer/release substrate) was applied onto a dry fiber preform in a closed mold, prior to infusion by the RTM resin—Sample No, 1. And a control run was made without the film. The dry fiber preform consists of 24 plies of dry standard modulus carbon fabrics, plain weave 3K. The RTM process was allowed to proceed, with the RTM resin infused into the mold and a curing temperature set at 356° F. for a period of time of 2 hours.

The composite or laminate part formed without the film layer resulted in a part having a fiber volume of 55-58% with visually observable surface porosity along the edges of the cured composite or laminate part.

In contrast, the composite or laminate part formed with the film which was then removed, resulted in a part having a fiber volume of 60% without observable surface porosity along the edges of the cured composite or laminate part, or anywhere on the part for that matter.

What is claimed is:

1. A process for improving the surface finish of, and the resin consolidation in, a composite or laminate part, steps of which comprise:
    providing a preform into a mold;
    providing a film comprising: i. a release liner; ii. a first resin; and iii. an expandable agent onto the preform disposed within the mold prior to providing a second resin into the mold;
    providing a second resin comprising one or more of oxazine, oxazoline, epoxy, episulfide, cyanate ester, maleimide, nadimide, itaconimide, phenolic, thiophenolic, or combinations thereof, and expandable thermoplastic resin microspheres, into the mold;
    subjecting the preform, film and second resin to conditions appropriate to cure the second resin and expand the film to form a composite or laminate part; and
    removing the expanded film from the composite or laminate part to reveal a composite or laminate part having improving surface finish and resin consolidation.

2. The process of claim 1, wherein the release liner is a polytetrafluoroethylene substrate.

3. The process of claim 1, wherein the first resin comprises an epoxy resin.

4. The process of claim 1, wherein the epoxy resin comprises bisphenol-A epoxy resin.

5. The process of claim 1, wherein the expandable agent comprises a blowing agent.

6. The process of claim 1, wherein the expandable agent comprises expandable thermoplastic resin microspheres.

7. The process of claim 1, wherein the film further comprises a curing agent.

8. The process of claim 7, wherein the curing agent is dicyandiamide.

9. The process of claim 1, wherein the film further comprises a toughener.

10. The process of claim 9, wherein the toughener is 4,4-diaminodiphenyl sulfone.

11. The process of claim 1, wherein the second resin comprises an oxazine and an epoxy.

* * * * *